UNITED STATES PATENT OFFICE.

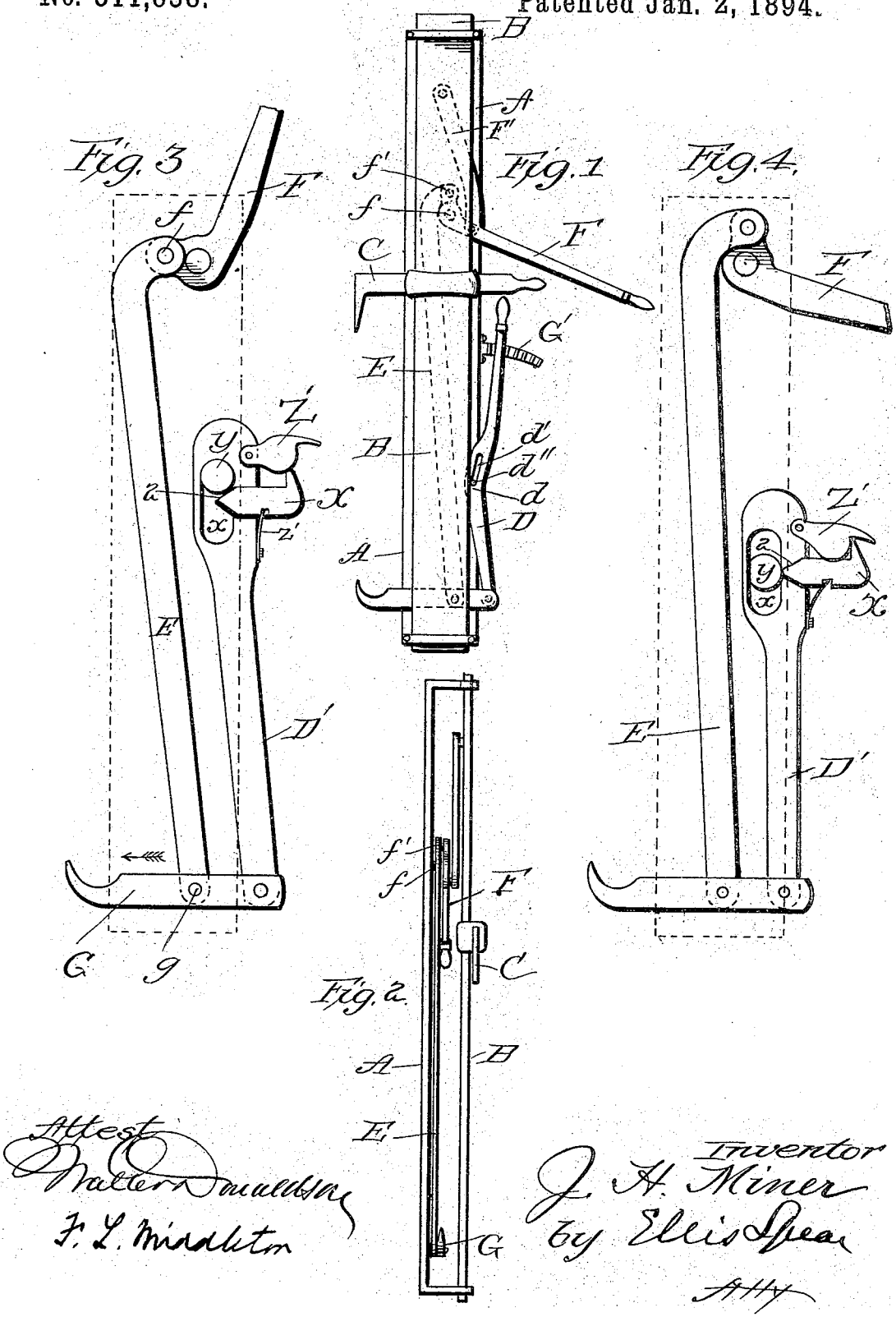

JAMES H. MINER, OF BILOXI, MISSISSIPPI.

SAWMILL-DOG.

SPECIFICATION forming part of Letters Patent No. 511,858, dated January 2, 1894.

Application filed April 11, 1893. Serial No. 469,863. (No model.)

*To all whom it may concern:*

Be it known that I, JAMES H. MINER, a citizen of the United States of America, residing at Biloxi, in the county of Harrison and State of Mississippi, have invented certain new and useful Improvements in Sawmill-Dogs, of which the following is a specification.

My invention is an improvement in saw mill dogs, and the object of the invention is to provide an improved construction in which the lower dog may be adjusted in or out to accommodate it to different sizes and shapes of logs.

I have illustrated my invention in the accompanying drawings, in which—

Figure 1, represents a side elevation of my improved form of dog, showing the upper and lower dogs adapted to be operated by a single lever. Fig. 2, is a detail view. Figs. 3 and 4 are views of a modification.

Referring by letters and numerals to the figures, A, represents a standard which is mounted upon the saw mill carriage and which is provided with a way or ways in which reciprocates the vertically movable bar B. Upon the bar B, is mounted the upper dog C, which is adjustably secured to the bar B, in any suitable or desired manner well known to those familiar with saw mill appliances. The lower dog is suspended from the lower ends of two rods or levers D, and E, as shown, one D, being designed to provide for the horizontal adjustment of the dog, and the other, E, being connected to the operating handle by means of which the dogs are operated to grip and release the log.

The handle F, by which the dogs are operated as before stated is pivotally connected to the standard at $f$, and has an angular extension $f'$ to which the upper end of the rod E, is pivotally connected, the lower end of the rod E, being connected to the lower dog G, as before stated, this connection being shown at $g$. The handle F, is also connected by the rod F' to the vertically sliding bar B, as shown, so that the movement of the handle in the direction of the arrow will tend to draw downward upon the bar B, thus forcing the upper dog down into the upper surface of the log, while the lower dog, through the rod E, will be drawn upward to grip the under face of the log.

The rod or lever D, is designed to shift the lower dog in and out as before stated, and to accomplish this purpose it is pivoted at its central portion to the standard as at $d$, while its upper end near the handle is designed to engage a rack G', projecting from the rear side of the standard. It will thus be seen that the outward movement of the handle away from the standard will tend to throw the dog in the opposite direction to adapt it to large or uneven logs, while the movement of the handle toward the standard will draw the dog toward the standard also. If the rod or lever D were securely held by its pivot against vertical movement too great an amount of movement would be given to the outer end of the lower dog, and to obviate this I have provided a sliding pivotal connection between the rod D and the standard. This I prefer to accomplish by simply forming a slot $d'$ in the rod which is engaged by a pin $d''$, this allowing a certain amount of vertical movement to the handle, without in any way interfering with the effective working of the device, as in clamping the log the handle will simply rise until the pin engages the lower end of the slot when the continued movement of the handle will force the dog into the log as its rear end will then be held against vertical movement.

It will be understood that while I have shown in the first two figures the lower dog connected with the upper dog and designed to be operated by the same handle, I do not desire to limit myself in this respect as any form of upper dog might be used in connection with my lower dog, and either provided with operating connections thereto or entirely independent as may be desired.

In Figs. 3 and 4, I have illustrated a modification in which the lower dog is designed to adjust itself automatically to the log. In these figures, for the reason above stated I have not deemed it necessary to show an upper dog. The lower dog and the operating lever for causing it to engage the log are substantially the same as in Figs. 1 and 2. As the lever D' however is designed to operate automatically the handle and rack are dispensed with. I increase the size of the pivot $y$ and the slot $x$ and provide a sliding bar X traveling in a suitable way in the bar or lever D'. This bar X is provided with an inclined face 2, which bears against the under side of the pivot and is held normally in contact therewith by a spring $z'$ as shown in Fig. 3. In this position the upward movement of the lifting bar E will swing the dog outward in the direction of the arrow Fig. 3, until the point of the dog comes in contact with the log as the engagement of the bar X with the pivot pin prevents the upward movement of the rear end of the dog. As soon, however, as the point of the dog contacts with the log the resistance will cause the rear end of the dog to rise pushing upward on the bar D' and causing the inclined face of bar X to bear with greater force on the rounded side of the pivot and finally, overcoming the pressure of the spring, will force said bar X outward against the spring into the position shown in Fig. 4, in which position the cam Z' at once drops behind the projection on the bar and holds it firmly in its outward position.

I claim—

1. In combination with the standard, a freely swinging lifting link, a dog mounted on said link, and connections between the rear end of said dog and standard for swinging the dog, substantially as described.

2. In combination the standard, a freely suspended lifting link, a dog pivotally connected with the lower end of said link, and a rod connecting the rear end of the dog and standard, substantially as described.

3. In combination, the standard, the lifting link, the dog having its central portion pivotally mounted on the lower end of the link, and a rod connecting the rear end of the dog with the standard, said rod having a limited sliding connection with the standard, substantially as described.

In testimony whereof I affix my signature in presence of two witnesses.

JAMES H. MINER.

Witnesses:
GEO. W. WILKES,
W. H. MAYBIN.